(12) United States Patent
Oh

(10) Patent No.: US 10,223,448 B2
(45) Date of Patent: Mar. 5, 2019

(54) GAME ASSISTANCE SYSTEM

(71) Applicant: I-ON COMMUNICATIONS CO., LTD., Seoul (KR)

(72) Inventor: Jae Cheol Oh, Seoul (KR)

(73) Assignee: I-ON COMMUNICATIONS CO., LTD., Seoul (KR)

( * ) Notice: Subject to any disclaimer, the term of this patent is extended or adjusted under 35 U.S.C. 154(b) by 0 days.

(21) Appl. No.: 15/951,908

(22) Filed: Apr. 12, 2018

(65) Prior Publication Data

US 2018/0232447 A1    Aug. 16, 2018

Related U.S. Application Data

(63) Continuation of application No. PCT/KR2016/014403, filed on Dec. 9, 2016.

(30) Foreign Application Priority Data

Jul. 25, 2016  (KR) ........................ 10-2016-0094181

(51) Int. Cl.
| | | |
|---|---|---|
| H04R 27/00 | (2006.01) | |
| G06F 17/30 | (2006.01) | |
| A63B 71/06 | (2006.01) | |
| A63B 24/00 | (2006.01) | |
| G06F 3/16 | (2006.01) | |

(52) U.S. Cl.
CPC ........ *G06F 17/30775* (2013.01); *A63B 24/00* (2013.01); *A63B 71/06* (2013.01); *G06F 3/16* (2013.01); *G06F 17/30769* (2013.01); *H04R 27/00* (2013.01)

(58) Field of Classification Search
CPC ........ A63B 71/06; A63B 24/00; G06Q 50/10; G06Q 50/00; H04W 4/12; H04W 4/00; H04W 88/18; H04M 11/08; G06F 3/16
USPC .............................................. 381/82; 725/32
See application file for complete search history.

(56) References Cited

U.S. PATENT DOCUMENTS

| | | | |
|---|---|---|---|
| 5,574,422 A | 11/1996 | Martin | |
| 2007/0178973 A1* | 8/2007 | Camhi | ..................... A63F 13/12 463/43 |
| 2012/0246675 A1* | 9/2012 | Masewicz | ........... G06Q 30/0254 725/32 |

FOREIGN PATENT DOCUMENTS

| | | | |
|---|---|---|---|
| JP | H09-47534 A | | 2/1997 |
| JP | 2007-034478 A | | 2/2007 |
| JP | 2007034478 A | * | 2/2007 |
| KR | 10-2009-0001477 A | | 1/2009 |
| KR | 10-2012-0004631 A | | 1/2012 |
| KR | 20120004631 A | * | 1/2012 |
| KR | 10-2012-0009866 A | | 2/2012 |

(Continued)

*Primary Examiner* — Melur Ramakrishnaiah
(74) *Attorney, Agent, or Firm* — Lathrop Gage LLP

(57) ABSTRACT

The disclosed technology provides a game assistance system which allows a game helper to select audio data corresponding to game judgments and a game progress and allow the selected audio data to be output through a stadium speaker, and comprises: an information storage unit for storing game progress information; a signal receiving unit for receiving a game progress request signal from a game helper terminal; a control unit for selecting in the information storage unit the game progress information corresponding to the game progress request signal; and a signal transmission unit for transmitting the selected game progress information to the game helper terminal.

11 Claims, 2 Drawing Sheets

(56) References Cited

FOREIGN PATENT DOCUMENTS

KR     10-2014-0063105 A     5/2014
WO     02/087707 A1     11/2002

\* cited by examiner

GAME ASSISTANCE SYSTEM

CROSS-REFERENCE TO RELATED APPLICATION

This application is a continuation of International Patent Application No. PCT/KR2016/014403, filed Dec. 9, 2016, which claims priority to Korean Patent Application No. 10-2016-0094181, filed Jul. 25, 2016. The above applications are all hereby incorporated by reference for all purposes as if fully set forth herein.

TECHNICAL FIELD

Some implementations of the disclosed technology relate to a game assistance system for assisting the progress of a game. For example, some implementations of the disclosed technology allow a game helper to select audio data corresponding to game judgments and a game progress and allow the selected audio data to be output through a stadium speaker.

BACKGROUND

FIG. 1 is a photograph showing a stadium where an amateur baseball game is played.

Unlike professional games, such as a professional baseball game, where many spectators enter, watch and cheer, amateur games, such as an amateur baseball game, are not crowded as shown in FIG. 1. Players and referees who participate in the game in such a quiet atmosphere lose much attention and lose interest during the game. This may be also an obstacle to the proliferation of amateur games.

Although an amateur game, such as an amateur baseball game, may not be too crowded, if a player's introductory announcement, an intense voice of judgment, a crowd shout, a cheering music, etc. is presented at an appropriate time during the game (as in a professional game), the players participating in the game may feel they are playing in front of a large crowd. Resultantly, the game may be livelier, and a small number of spectators may be able to immerse themselves in the game.

SUMMARY

Various implementations are provided to provide a stadium with voices and sounds associated with a game progress and judgment at an appropriate time so that a game atmosphere is not slackened in a game where there are not many spectators.

Some implementation of the disclosed technology provides a game assistance system connected to a game helper terminal and a game participant terminal to assist a game progress.

In some implementations, the game assistance system may include: an information storage unit for storing game progress information; a signal receiving unit for receiving a game progress request signal from the game helper terminal; a control unit for selecting in the information storage unit the game progress information corresponding to the game progress request signal; and a signal transmission unit for transmitting the selected game progress information to the game helper terminal.

In some implementations, the game progress information may include audio data, and the game progress request signal may include a game judgment signal. The control unit may select the audio data corresponding to the game judgment signal.

In some implementations, the game progress request signal may include a game judgment signal. The game assistance system may further comprise a game record calculation unit for calculating a game record for a game participant based on the game judgment signal.

In some implementations, the information storage unit may store the game record. When the signal receiving unit receives a game participant introduction signal for the game participant from the game helper terminal, the control unit may select the game record corresponding to the game participant, and the signal transmission unit may transmit the selected game record to the game helper terminal.

In some implementations, when the signal receiving unit receives a game interruption request signal from a game participant terminal, the control unit may select in the information storage unit the game progress information corresponding to the game interruption request signal, and the signal transmission unit may transmit the selected game progress information to the game helper terminal.

Some implementations of the disclosed technology provide a game assistance system including: a game helper terminal; a speaker connected to the game helper terminal; an information storage unit for storing game progress information; a signal receiving unit for receiving a game progress request signal from the game helper terminal; a control unit for selecting in the information storage unit the game progress information corresponding to the game progress request signal; and a signal transmission unit for transmitting the selected game progress information to the game helper terminal. The game helper terminal may output the transmitted game progress information through the speaker.

In some implementations, the game progress information may include audio data, and the game progress request signal may include a game judgment signal. The control unit may select the audio data corresponding to the game judgment signal, the selected audio data may be transmitted to the game helper terminal by the signal transmission unit, and the game helper terminal may output the transmitted audio data through the speaker.

In some implementations, the game assistance system may further include a game helper input device connected to the game helper terminal and having buttons corresponding to the game progress request signals. When the button is pressed, the game helper input device may transmit a button-press signal of the button to the game helper terminal, and the game helper terminal may transmit to the signal receiving unit the game progress request signal corresponding to the button.

In some implementations, the game progress request signal may include a game judgment signal. The game assistance system may further comprise a game record calculation unit for calculating a game record for a game participant based on the game judgment signal.

In some implementations, the information storage unit may store the game record, and the game progress request signal may include a game participant introduction signal. When the signal receiving unit receives the game participant introduction signal for the game participant from the game helper terminal, the control unit may select the game record corresponding to the game participant, the signal transmission unit may transmit the selected game record to the game helper terminal, and the game helper terminal may output the transmitted game record through the speaker.

In some implementations, the game assistance system may further include a game participant terminal. When the signal receiving unit receives a game interruption request signal from the game participant terminal, the control unit may select in the information storage unit the game progress information corresponding to the game interruption request signal, the signal transmission unit may transmit the selected game progress information to the game helper terminal, and the game helper terminal may output the transmitted game progress information through the speaker.

According to the implementations of the disclosed technology, a mechanism is provided to provide a stadium with voices and sounds associated with a game progress and judgment at an appropriate time so that a game atmosphere is not slackened in a game where there are not many spectators.

DETAILED DESCRIPTION

Figure 1:
FIG. 1 is a photograph showing a stadium where an amateur baseball game is played.

Hereinafter, various implementations of the disclosed technology will be described in detail with reference to the accompanying drawings so that those skilled in the art can easily carry out the disclosed technology. In the following detailed description of the embodiments of the disclosed technology, a detailed description of known functions or configurations will be omitted. The same reference numerals are used throughout the drawings for portions having similar functions and actions.

In addition, in the entire specification, when a part is referred to as being "connected" with another part, it is not only a case where it is directly connected, but also a case where it is indirectly connected with another element therebetween. Also, "comprising" and "including" mean that other components may be included, rather than excluding other components, unless specifically stated otherwise.

Figure 2:
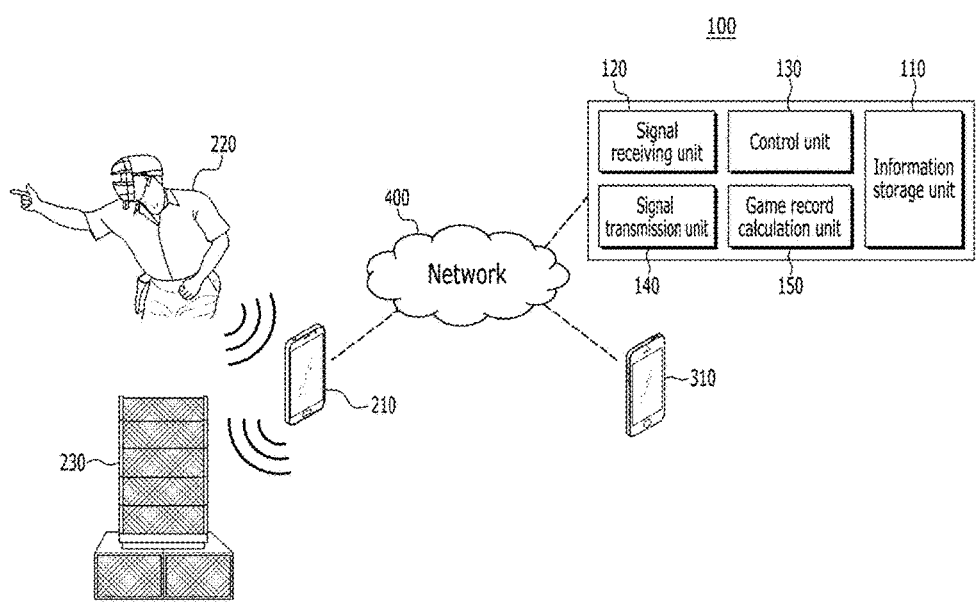
FIG. 2 is a schematic diagram of a game assistance system according to an implementation of the disclosed technology.
Figure 3:
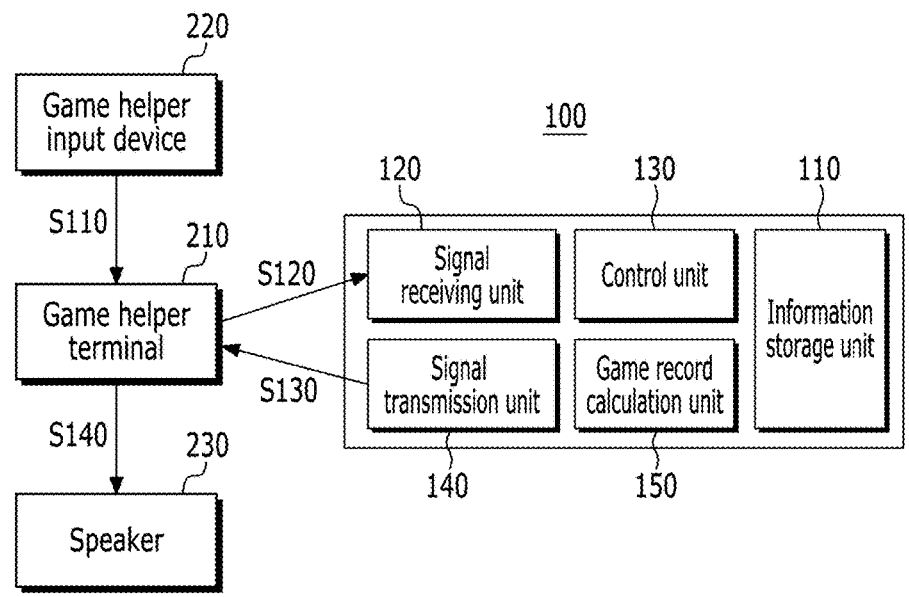
FIG. 3 is a diagram illustrating a step performed in accordance with an input of a game helper input device in a game assistance system according to an implementation of the disclosed technology.

FIG. 2 is a schematic diagram of a game assistance system according to an implementation of the disclosed technology. FIG. 3 is a diagram illustrating a step performed in accordance with an input of a game helper input device in a game assistance system according to an implementation of the disclosed technology.

An exemplary game assistance system 100 may comprise an information storage unit 110, a signal receiving unit 120, a control unit 130, a signal transmission unit 140, and a game record calculation unit 150. The game assistance system 100 may further comprise a game helper terminal 210, a game helper input device 220, a speaker (also referred to herein as a "stadium speaker") 230, and a game participant terminal 310. The term "unit" as used herein may include software, hardware, or a combination thereof depending on the context in which the term is used. For example, the software may be machine code, firmware, embedded code, application software, or a combination thereof. Also, for example, the hardware may be a circuit, a processor, a computer, an integrated circuit, integrated circuit cores, or a combination thereof. The units in the disclosed technology may be implemented in one computer in some applications, or may be distributed in more than one computers or servers linked to a communication network to allow communications among them.

The game helper terminal 210 refers to a device capable of connecting to the game assistance system 100 through the network 400 to transmit and receive data, and is preferably a smart phone, a tablet PC, and the like. The network 400 refers to a known wired or wireless network capable of data transmission, and includes an Internet network, a data communication network, and the like. The game helper terminal 210 is preferably carried by a game helper (for example, a referee).

The game helper input device 220 is an input device carried by a game helper, which refers to a portable device on which buttons related to judgment or progress are formed and can be easily pressed during the game. The game helper input device 220 may be connected to the game helper terminal 210 via a known local area wireless communication network such as Bluetooth or a known wireless communication network such as Wi-Fi. The game helper input device 220 may be connected to the game helper terminal 210 by wire.

When the button of the game helper input device 220 is pressed, the game helper input device 220 may transmit to the game helper terminal 210 a button press signal indicating that the button is pressed (S110). The game helper terminal 210 may transmit to the signal receiving unit 120 the game progress request signal corresponding to the pressed button (S120).

Here, it is described that the game helper presses the button of the game helper input device 220. However, it is also possible that the game helper transmits a game progress request signal to the signal receiving unit 120 through the game helper terminal 210 without the game helper input device 220.

The information storage unit 110 may store game progress information. The game progress information may include audio data, a list of players to be played, and a game record. In the case that the game is a baseball game, the game progress information may be audio data including a referee's voice for judgment such as "strike," "ball," "out," "safe," and the like. The referee's voice for judgment made of audio data is preferably formed in a tone or an intonation that can be fun for spectators and players, and may be combined with the sound of music or crowd shouting.

The game progress information may be a game record of the player and audio data obtained by converting the game record of the player into a voice. In the case that the game is a baseball game, the game progress information may include the voice of the stadium announcer such as "Cleanup hitter! Daeho Lee!" "Daeho Lee, cleanup hitter, has no hit in 2 at-bats today," and "Daeho Lee, cleanup hitter, has played in five games so far, and has a home run with a batting average of 0.285." The stadium announcer's voice of the audio data is preferably formed in a tone and an intonation that can be fun for spectators and players, and may be combined with the sound of music or crowd shouting.

The game progress information may be a list of the players submitted before the game by the coach who is a game participant. The coach may access the game assistance system 100 through the wired/wireless network and input the list of the players.

The signal receiving unit 120 may receive a game progress request signal from the game helper terminal 210 through the network 400 (S120). The game progress request signal may include a game participant introduction signal, a game progress signal, and a game judgment signal. For example, the game participant introduction signal may be a signal for requesting a game progress information related to a game participant introduction such as "Cleanup hitter! Daeho Lee!" or a game participant's game record introduction. The game progress signal may be a signal for requesting audio data for a game progress notification such as "play ball." The game judgment signal may be a signal for requesting audio data for a referee's judgment such as "strike," "ball," "out," "safe" and the like.

The control unit 130 may select in the information storage unit 110 the game progress information corresponding to the game progress request signal.

The signal transmission unit 140 may transmit to the game helper terminal 210 or the speaker 230 the game progress information selected by the control unit 130 through the network 400 (S130).

The game helper terminal 210 may be connected to the speaker 230 via a known local area wireless communication network such as Bluetooth or a known wireless communication network such as Wi-Fi. The game helper terminal 210 may be connected to the speaker 230 by wire. In embodiments, the speaker 230 may be remote from the game helper terminal 210 (i.e., the speaker 230 may not be part of the game helper terminal 210, but may be an external speaker situated a distance (e.g., a foot, 5 feet, 10 feet, etc.) away from the game helper terminal 210). Alternately or in addition, the speaker 230 may be part of the game helper terminal 210. The game helper terminal 210 may output the game progress information transmitted by the signal transmission unit 140 through the speaker 230 (S140). The audio data including the referee's voice for the judgment such as "strike," "ball," "out," "safe" and the like or audio data including the stadium announcer's voice introducing the player may be output through the speaker 230. The speaker 230 may be connected to the game helper terminal 210 together with a display device for outputting a video signal.

The game record calculation unit 150 may calculate a game record for a game participant based on the game judgment signal transmitted as a game progress request signal. The records of all the judgment signals transmitted by the game helper terminal 210 may be continually applied to the game records of the game participants stored in the information storage unit 110 to update the game records of the game participants.

The updated game record may be output through the speaker 230 when the game participant appears on the playing field. When the player enters the playing field, the game helper may press a button on the game helper input device 220, corresponding to the game participant introduction, and then the game helper terminal 210 may transmit to the signal receiving unit 120 the game participant introduction signal as a game progress request signal. The control unit 130 may select a game record corresponding to the game participant, and the signal transmission unit 140 may transmit the game record to the game helper terminal 210. The game helper terminal 210 may output the game record through the speaker 230.

Figure 4:
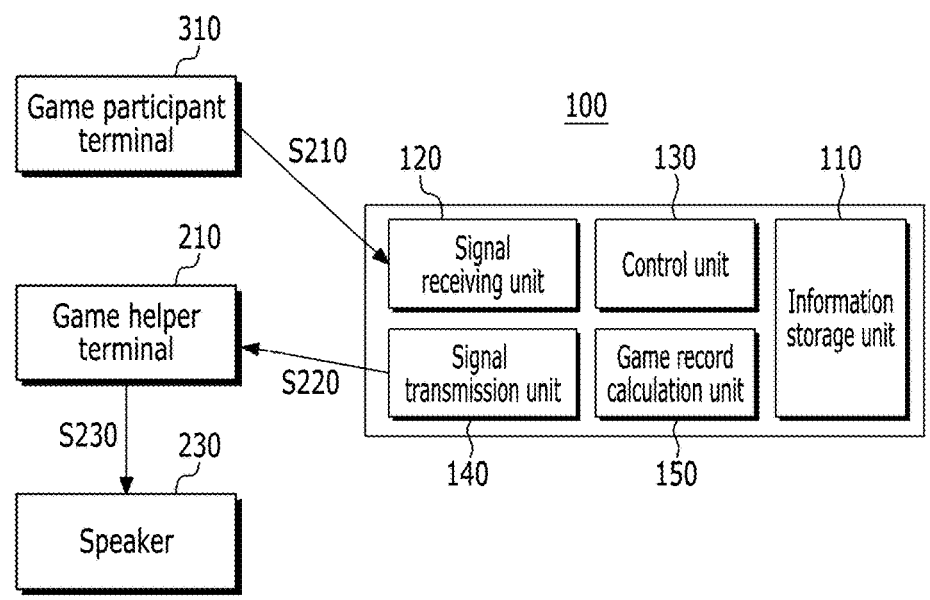
FIG. 4 is a diagram illustrating a step performed in accordance with an input of a game participant terminal in a game assistance system according to an implementation of the disclosed technology.

FIG. 4 is a diagram illustrating a step performed in accordance with an input of a game participant terminal in a game assistance system according to an implementation of the disclosed technology.

The game participant terminal 310 refers to a device capable of connecting to the game assistance system 100 through the network 400 to transmit and receive data, and is preferably a smart phone, a tablet PC, and the like. The game participant terminal 310 is preferably carried by a game participant (for example, a coach and a player).

The game participant terminal 310 may be used to make a game interruption request such as a player substitution. When the game participant terminal 310 transmits the game interruption request signal to the signal receiving unit 120 through the network 400 (S210), the control unit 130 may select in the information storage unit 110 the game progress information corresponding to the game interruption request signal (for example, audio data including a voice of "timeout"). The signal transmission unit 140 may transmit the selected game progress information to the game helper terminal 210 (S220). The game helper terminal 210 may output the transmitted game progress information through the speaker 230 (S230).

An exemplary game assistance system 100 may further comprise a drone, an image information receiving unit, an image information transmission unit, and a display device. The drone may shoot participants, and the image information receiving unit may receive the shot data from the drone through a known wired/wireless network. The image information transmission unit may transmit the shot data to the terminals of the members of the game assistance system 100 or the display device of the stadium.

Hereinafter, a case in which the game assistance system 100 according to an implementation of the disclosed technology is applied to a baseball game will be described step by step. It is to be noted that the baseball game is merely an example game for explaining the constitution of the game assistance system, and the disclosed technology is not limited to the baseball game. The disclosed technology may be applicable to all sport games and competitions.

It is preferable that the coaches and players who are the game participants participating in the baseball game are registered as members of the game assistance system 100. Before the start of the baseball game, each of the two team coaches who are the game participants may access the game assistance system 100, login to the game assistance system 100 by inputting the ID and the password, and input the name and batting order of the players.

The information storage unit 110 of the game assistance system 100 may store a game record (e.g., name, affiliation, position, number, batting average, defense rate, number of competitions, etc.) of each player. The game record may be updated by the game record calculation unit 150 and stored in the information storage unit 110 during the course of the baseball game.

When the baseball game is started, a referee, who is a game helper, may carry the game helper input device 220 with his or her body. When the referee notifies the start of the game and presses the "start" button of the game helper input device 220, the game helper input device 220 may transmit a "start" button press signal to the game helper terminal 210 connected to the game helper input device 220 wirelessly or by wire. The game helper terminal 210 may transmit a "start" signal as a game progress request signal to the signal receiving unit 120 through the network 400. The control unit 130 may search the information storage unit 110 for the game progress information corresponding to the "start" signal transmitted to the signal receiving unit 120 and select the audio data including the voice of "play ball" as game progress information. The signal transmission unit 140 may transmit the audio data including the voice of "play ball" to the game helper terminal 210 through the network 400. The game helper terminal 210 may transmit the audio data including the voice of "play ball" to the speaker 230 connected to the game helper terminal 210 wirelessly or by wire so that the voice of "play ball" is output to the stadium. In order to enhance the atmosphere of the stadium, it may be possible to output an exciting music or a crowd shouting sound in addition to the voice.

When the first batter of the attacking team emerges, the referee may press a "batter's entry" button of the game helper input device 220, and the game helper input device 220 may transmit the "batter's entry" button press signal to the game helper terminal 210 connected to the game helper input device 220 wired or wirelessly. The game helper terminal 210 may transmit the "batter's entry" signal as a game progress request signal to the signal receiving unit 120 through the network 400. The control unit 130 may search the information storage unit 110 for the game progress information corresponding to the "batter's entry" signal transmitted to the signal receiving unit 120, and select the game record for the first batter and the audio data including the voice for the game record for the first batter as the game progress information on the list of the players entered by the attack team coach. The signal transmission unit 140 may transmit to the game helper terminal 210 the audio data including the game record for the first batter to the game helper terminal 210 the game record for the first batter and the audio data including the voice for the game record for the first batter through the network 400. The game helper terminal 210 may transmit the audio data including the voice for the game record for the first batter to the speaker 230 connected to the game helper terminal 210 wirelessly or by wire so that the voice of "Leadoff hitter! Chulsoo Kim!" or "Chulsoo Kim, leadoff hitter, has played in twelve games so far, and has a batting average of 0.329" is output to the stadium. In order to enhance the atmosphere of the stadium, it may be possible to output the exciting music specified to the first batter or the crowd shouting sound in addition to the voice.

Although it has been described herein that the audio data including the voice for the game record has been stored in the information storage unit 110 in advance and is transmitted to the game helper terminal 210, it is possible that only the game record is transmitted to the game helper terminal 210, and the program installed on the game helper terminal 210 converts the transmitted game record into a voice.

When the pitcher of the defensive team throws a ball and becomes a strike, the referee may press a "strike" button of the game helper input device 220. The game helper input device 220 may transmit a "strike" button press signal to the game helper terminal 210 connected to the game helper input device 220 wirelessly or by wire. The game helper terminal 210 may transmit the "strike" signal as a game progress request signal to the signal receiving unit 120 through the network 400. The control unit 130 may search the information storage unit 110 for the game progress information corresponding to the "strike" signal transmitted to the signal receiving unit 120, and select the audio data including the voice of "strike" as game progress information. The signal transmission unit 140 may transmit the audio data including the voice of "strike" to the game helper terminal 210 through the network 400. The game helper terminal 210 may transmit the audio data including the voice of "strike" to the speaker 230 connected to the game helper terminal 210 wirelessly or by wire so that the voice of "strike" is output to the stadium. In order to enhance the atmosphere of the stadium, it may be possible to output an exciting music or a crowd shouting sound in addition to the voice.

When the attacking batter hits a double, the referee may press a "double" button on the game helper input device 220. The game helper input device 220 may transmit a "double" button press signal to the game helper terminal 210 connected to the game helper input device 220 wirelessly or by wire. The game helper terminal 210 may transmit the "double" signal as a game progress request signal to the signal receiving unit 120 through the network 400. The control unit 130 may search the information storage unit 110 for the game progress information corresponding to the "double" signal transmitted to the signal receiving unit 120, and select the audio data including the voice of "double" as game progress information. The signal transmission unit 140 may transmit the audio data including the voice of "double" to the game helper terminal 210 through the network 400. The game helper terminal 210 may transmit the audio data including the voice of "double" to the speaker 230 connected to the game helper terminal 210 wirelessly or by wire so that the voice of "double" is output to the stadium. In order to enhance the atmosphere of the stadium, it may be possible to output an exciting music or a crowd shouting sound in addition to the voice.

The game record calculation unit 150 may update the game record of each batter by using the attack result of each batter. The updated game record may be stored in the information storage unit 110 and may be used in the next at bat.

Although it has been described herein that the audio data including the voice related to the game judgment has been stored in the information storage unit 110 in advance and is transmitted to the game helper terminal 210, the audio data stored in advance in the game helper terminal 210 may be used.

When the coach who is a game participant wants to send in a pinch hitter or to change pitchers, he or she may press a "time-out" button on the game helper input device 220. The game participant terminal 310 may transmit the "time-out" button press signal to the signal receiving unit 120 through the network 400. The control unit 130 may search the information storage unit 110 for the game progress information corresponding to the "time-out" signal transmitted to the signal receiving unit 120, and select the audio data including the voice of "time-out" as game progress information. The signal transmission unit 140 may transmit the audio data including the voice of "time-out" to the game helper terminal 210 through the network 400. The game helper terminal 210 may transmit the audio data including the voice of "time-out" to the speaker 230 connected to the game helper terminal 210 wirelessly or by wire so that the voice of "time-out" is output to the stadium. In order to enhance the atmosphere of the stadium, it may be possible to output an exciting music or a crowd shouting sound in addition to the voice.

A game assistance system according to an implementation of the disclosed technology is designed to improve the concentration of a player and a referee in a game by boosting the amateur game where there are not many spectators and to provide amusement to players, referees and spectators to contribute to the expansion of the base of amateur sports.

Although specific embodiments have been described above, it will be apparent to those skilled in the art that various modifications may be made without departing from the scope of the disclosed technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve described results. Moreover, the separation of various system components in the embodiments described in this patent document should not be understood as requiring such separation in all embodiments. Only a few implementations and examples are described. Other implementations, enhancements and variations can be made based on what is described and illustrated in this patent document.

REFERENCE NUMERALS

100: Game assistance system
110: Information storage unit 110
120: Signal receiving unit
130: Control unit
140: Signal transmission unit
150: Game record calculation unit
210: Game helper terminal
220: Game helper input device
230: Speaker
310: Game participant terminal
400: Network

What is claimed is:

1. A game assistance system connected to a game helper terminal and a game participant terminal to assist a game progress, the game assistance system comprising:
an information storage unit for storing audio data corresponding to game progress information in advance;
a signal receiving unit for receiving a game progress request signal from the game helper terminal and a game interruption request signal from the game participant terminal;
a control unit for selecting in the information storage unit the audio data corresponding to the game progress information corresponding to the game progress request signal and the game interruption request signal; and
a signal transmission unit for transmitting the selected audio data to the game helper terminal;
wherein:
the game progress information includes information related to a game judgment, a game participant, and a game progress;
the audio data transmitted to the game helper terminal is output through a stadium speaker remote from the game helper terminal; and
the game interruption request signal is configured to interrupt the game progress.

2. The game assistance system according to claim 1, wherein:
the game progress request signal comprises a game judgment signal; and
the control unit selects the audio data corresponding to the game judgment signal.

3. The game assistance system according to claim 1, wherein:
the game progress request signal comprises a game judgment signal; and
the game assistance system further comprises a game record calculation unit for updating a game record for a game participant based on the game judgment signal.

4. The game assistance system according to claim 3, wherein:
the information storage unit stores the updated game record; and
when the signal receiving unit receives a game participant introduction signal for the game participant from the game helper terminal, the control unit selects the updated game record corresponding to the game participant, and the signal transmission unit transmits the audio data corresponding to the updated game record to the game helper terminal.

5. The game assistance system according to claim 1, wherein the game participant terminal is usable by a game participant to at least one of: (a) call a timeout and (b) make a player substitution.

6. A game assistance system comprising:
a game helper terminal;
a game participant terminal;
a stadium speaker remote from and connected to the game helper terminal;
an information storage unit for storing audio data corresponding to game progress information in advance;
a signal receiving unit for receiving a game progress request signal from the game helper terminal and a game interruption request signal from the game participant terminal;
a control unit for selecting in the information storage unit the audio data corresponding to the game progress information corresponding to the game progress request signal and the game interruption request signal; and
a signal transmission unit for transmitting the selected audio data to the game helper terminal;
wherein:
the game helper terminal outputs the transmitted audio data through the stadium speaker;
the game progress information includes information related to a game judgment, a game participant and a game progress; and
the game interruption signal is configured to interrupt the game progress.

7. The game assistance system according to claim 6, wherein:
the game progress request signal comprises a game judgment signal, and
the control unit selects the audio data corresponding game progress information corresponding to the game judgment signal, the selected audio data is transmitted to the game helper terminal by the signal transmission unit, and the game helper terminal outputs the transmitted audio data through the stadium speaker.

8. The game assistance system according to claim 6, further comprising:
    a game helper input device connected to the game helper terminal and having buttons corresponding to the game progress request signals,
    wherein when the button is pressed, the game helper input device transmits a button-press signal of the button to the game helper terminal, and the game helper terminal transmits to the signal receiving unit the game progress request signal corresponding to the button.

9. The game assistance system according to claim 6, wherein:
    the game progress request signal comprises a game judgment signal, and
    the game assistance system further comprises a game record calculation unit for updating a game record for a game participant based on the game judgment signal.

10. The game assistance system according to claim 9, wherein:
    the information storage unit stores the updated game record,
    the game progress request signal includes a game participant introduction signal, and
    when the signal receiving unit receives the game participant introduction signal for the game participant from the game helper terminal, the control unit selects the updated game record corresponding to the game participant, the signal transmission unit transmits the audio data corresponding to the updated game record to the game helper terminal, and the game helper terminal outputs the transmitted audio data through the stadium speaker.

11. The game assistance system according to claim 6 wherein the game participant terminal is usable to at least one of: (a) call a timeout and (b) make a player substitution.

\* \* \* \* \*